United States Patent Office 3,538,542
Patented Nov. 10, 1970

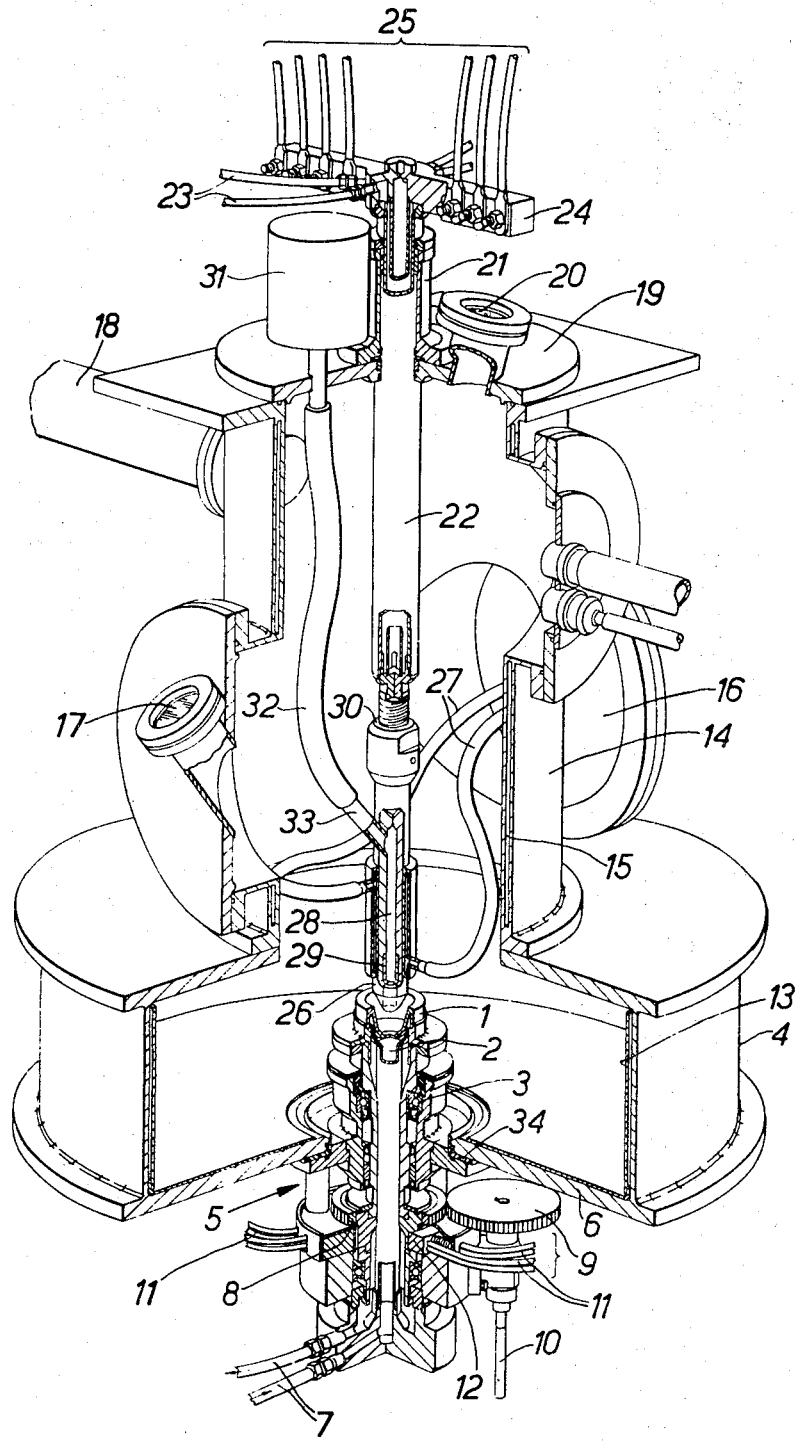

3,538,542
HOLLOW ELECTRODE AND ROTATING CRUCIBLE APPARATUS FOR PRODUCTION OF PARTICULATE REFRACTORY MATERIAL
John Malcolm North, Abingdon, England, assignor to United Kingdom Atomic Energy Authority, London, England
Filed Dec. 13, 1967, Ser. No. 690,353
Claims priority, application Great Britain, Dec. 19, 1966, 56,718/66
Int. Cl. B22d 23/08
U.S. Cl. 18—2.6
2 Claims

ABSTRACT OF THE DISCLOSURE

Apparatus for making particulate refractory material, such as alumina, uranium carbide or tungsten, comprises a water-cooled, electrically-conducting crucible rotatable about its own axis, an arc electrode to coact therewith, means to feed powder to the crucible and means to permit molten material flung from the crucible to solidify before contacting a solid surface. The method of the invention can be applied to nuclear fuel to reprocess the same.

---

The present invention relates to the production of particulate refractory, e.g., ceramic material and has particular reference to the formation of generally spherical bodies of a size of the order of 50–2,500 microns. The term "ceramic material" should be understood to include the refractory oxides and carbides as well as materials such as nitrides, phosphides, etc. The invention can also be applied to refractory metals, e.g., tungsten.

Particulate material of the type above described, particularly when it is of high density, is useable for many purposes. For example, alumina is used as a catalyst support and as a heat transfer medium whilst similarly shaped particles of the nuclear materials are useable as a fuel. It will be appreciated that by a selection of various size particle fractions, it is possible to fill a container e.g., by vibro-compaction, to an overall high density.

It is an object of the present invention to provide a process for the manufacture of particulate bodies of refractory material.

According to the present invention, there is provided a process for the manufacture of particulate bodies of a refractory material which comprises establishing an arc between an electrode and a cooled crucible, feeding the refractory material into such crucible to be melted by the arc and simultaneously rotating the crucible about its axis of symmetry, whereby the molten material is flung therefrom, and allowing the said molten material to solidify without substantial contact with a solid surface.

Many of the ceramic materials mentioned above are known to be conductors of electricity, for example carbides, and no difficulty is encountered in the above described process. However, other ceramic materials, such as for example aluminium oxide, are known to be insulators and nonconductors of electricity at room temperature. However, we have found that at elevated temperatures these materials are conductors of electricity. We have also found that provided the arc is established between the electrode and the crucible before the crucible is completely loaded with alumina, the arc will be maintained when the alumina is added, even though a skull of alumina is formed on the crucible. This is surprising since alumina has no appreciable conductivity for electricity below 1000° C. and the surface of the skull in contact with the crucible would be expected to be considerably below that temperature.

The present invention is particularly useful in the case of ceramic materials such as are used for nuclear fuels. As explained above, a nuclear fuel, for example uranium or plutonium oxide or carbide, can be used in the form of small spheres of selected size ranges vibro-packed into a metallic can. The particles themselves will be of a density approaching the theoretical density but the packing density, even with the most suitably sized fractions, will result in a voidage in the can and it is known that it is possible to fill the interstices with some heat conducting material such as, for example, sodium. A known disadvantage of dense nuclear fuel is that during the fission process the fission products accumulate within the fuel and cannot escape readily therefrom or into the voids between the fuel particles. In the case of particulate fuel operating at a relatively high temperature, for example in a fast breeder reactor, the result will be a considerable measure of swelling after a burn-up of the order of 5 mwd./t. After this burn-up, although the fuel is heavily contaminated with fission products, it has still not reached the degree of contamination which renders it unusable from a neutron economy point of view even though physically it has tended to swell to such an extent as to tend to disrupt the can. A considerable portion of the swelling is accommodated between the particles but we have deduced that such a fuel requires to be unloaded from the can after a burn-up of about 5 mwd./t. It is proposed that fuel of this nature, whether or not the can contains sodium, should be reprocessed by melting in accordance with the present invention and should then be reloaded into the cans ready for reuse in a nuclear reactor. It will be appreciated that such fuel is highly active but since a wet reprocessing is not involved the cooling time can be considerably shorter than conventional. Melting in accordance with the process of this invention will remove the volatile and gaseous fission products, but the particles produced will still be contaminated with heavy metal fission products. Up to a limit of about 15 mwd./t. these heavy metal fission products are not important and therefore it is proposed that the fuel may undergo one or two "melt reprocessings" in accordance with this feature of the invention before a wet reprocessing becomes necessary from a neutron economy point of view. It may even be desirable to precede this wet processing by a melt reprocessing in accordance with this feature of the invention.

It should also be explained that the present invention can be applied to mixtures of ceramic materials and, for example, if the feed includes boron trioxide as well as uranium dioxide, the resulting particles will contain a fine dispersion of boron trioxide and thus contain a burnable poison.

The present invention also includes apparatus for carrying the same into effect and particulate refractory material when produced by the method of the invention.

In order that the present invention may more readily be understood, one embodiment of the same will now be described by way of example and with reference to the accompanying drawing which illustrates a furnace for carrying the same into effect, such illustration being in perspective with parts cut away.

In the embodiment of the furnace shown in the drawings, the apparatus comprises a copper crucible 1 which is provided with internal water cooling channels 2 and is mounted upon ball races 3. The crucible itself is located within a furnace drum 4 of 30" diameter whilst the crucible is 2¼" in internal diameter and 1½" deep. A vacuum-tight connection is made between the crucible mounting means generally indicated at 5 and the base 6 of the drum-shaped furnace body 4. At the bottom of the mounting means, water inlet and outlet pipes 7 are provided for conveying cooling water to the cooling passages 2. The mounting means 5 include a spur gear 8 which is in mesh with a second spur gear 9 on a drive shaft 10 so that the crucible can be rotated up to speeds of 2000 r.p.m. Power supplies for the crucible 1 are provided by conductors 11 and brushes 12 and the crucible mounting means 5 is insulated from the rest of the furnace by an insulating bush 34.

For ease in decontamination, since this furnace is designed for operation with uranium dioxide, the interior of the drum 4 has a removable liner 13.

Above the drum 4 is a furnace extension 14 of generally cylindrical form which is provided with water cooling channels 15 of conventional form. The furnace extension 14 is provided with access ports 16 and sight tubes 17 together with a gas off-take pipe 18 which permits the furnace to be run under a reduced pressure of argon or some other suitable atmosphere.

At the top of the furnace extension 14 is a top plate 19 provided with a sight tube 20 and carrying a central column 21. This column 21 houses an electrode support 22, the electrode support being water-cooled by way of pipes 23 and carrying a bus-bar 24 for connection to the (earthed) electricity supply by conductors 25. At its lower end, the electrode support 22 carries a water-cooled graphite electrode 26, water cooling being effected by way of pipes 27. This electrode 26 has an internal bore 28 and is counterbored at its lower end to receive a caesium impregnated hollow plug 29. Provision is made by a screw mechanism 30 for adjusting the effective axial position of the electrode 26 and the assembly comprising the electrode support 22 and electrode 26 is capable of axial movement within the column 21 so as to permit the arc to be struck by engaging the electrode 26 with the crucible 1.

Also mounted upon the top plate 19 is a container 31 which is provided with flow control means (not shown) and which is connected by means of a flexible pipe 32 to a side arm 33 giving access to the bore 28 of the electrode 26. Refractory material in the container 31 is therefore fed in a controlled manner to the centre of the electrode 26 so as to drop into the crucible 1 to be melted therein.

In one experiment carried out with apparatus as above described, the feed material was uranium carbide and the process was started by placing a small starting charge in the base of the crucible which was held stationary. Thereafter a low current arc was struck, the current was increased to 2000 amps at 14 volts whilst the electrode was being withdrawn and then the main feed of refractory material was started and the crucible rotated. The furnace atmosphere was argon at 0.3 atmosphere pressure.

It was found that the majority of the material flung out of the crucible solidified to spherical form and the mean particle size depended upon the speed of rotation of the crucible. Table 1 shows the relationship between particle size and speed of rotation. It was found that the particles had an equiaxed grain structure with a grain size of about 50 microns. The density of the particles (ethylene dibromide) was 98% of the theoretical density. We have found that a crucible speed between 200 and 2000 r.p.m. is desirable although speeds outside this range are possible.

TABLE 1

| Crucible rotation speed (r.p.m.) | Modal diameter of shot (μm) | Approx. size range containing ¾ of product | |
|---|---|---|---|
| | | Maximum (μm) | Minimum (μm) |
| 315 | 1,700 | 2,000 | 800 |
| 645 | 1,300 | 1,600 | 800 |
| 830 | 1,030 | 1,500 | 500 |
| 1,040 | 730 | 1,200 | 400 |
| 1,150 | 600 | 1,000 | 200 |
| 1,635 | 250 | 700 | 75 |
| 2,070 | 225 | 600 | 75 |

The above experiment was also repeated using uranium dioxide, which is typical of ceramics which do not become electrically conducting until heated to high temperatures. It was found that if a low current arc was struck between the electrode and the bottom of the empty crucible whilst it was rotating and this arc was then drawn out and the current increased to the maximum before the uranium dioxide was fed to the crucible, satisfactory results were obtained. It is important to note that apparently no damage was done to the crucible by the arc.

As there is a very large contraction in volume as uranium dioxide solidifies, the particles tended to contain a central cavity so that the overall densities were not as high as were obtained with the carbide. A similar effect was noted with alumina.

I claim:

1. Apparatus for the manufacture of particulate bodies of a refractory material comprising a crucible made of an electrically conducting material, water cooling means for the crucible, means to rotate the crucible about its axis, a hollow electrode positioned above the crucible, means to feed particulate refractory material to the interior of said electrode so as to fall into the crucible, means to permit movement of the electrode and crucible relatively towards and away from one another, means to supply electricity to the electrode and crucible to establish an arc therebetween, and a housing surrounding the crucible and spaced sufficiently far therefrom that molten material flung from the crucible has solidified prior to contacting the housing.

2. The apparatus of claim 1 further including means for forming a gas tight seal for said housing.

References Cited

UNITED STATES PATENTS

| 1,782,038 | 11/1930 | Haak. | |
| 2,310,590 | 2/1943 | Marette | 18—2.6 |
| 2,439,772 | 4/1948 | Gow | 264—8 |
| 2,897,539 | 8/1959 | McMillan | 264—8 |
| 3,099,041 | 7/1963 | Kaufmann | 264—8 |
| 3,234,051 | 2/1966 | Kiffer et al. | 23—273 |
| 3,346,673 | 10/1967 | Last | 264—8 |

WILBUR L. BASCOMB, JR., Primary Examiner

U.S. Cl. X.R.

18—1; 23—273, 293, 305, 313